(12) United States Patent
Ferlitsch

(10) Patent No.: US 8,054,497 B2
(45) Date of Patent: Nov. 8, 2011

(54) DIRECT COMPOSITION PRINTING METHOD FOR RAPID STREAMING

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1275 days.

(21) Appl. No.: 11/674,023

(22) Filed: Feb. 12, 2007

(65) Prior Publication Data

US 2008/0192296 A1 Aug. 14, 2008

(51) Int. Cl.
- *G06K 15/00* (2006.01)
- *G06K 15/02* (2006.01)
- *H04N 1/387* (2006.01)
- *G06F 3/12* (2006.01)

(52) U.S. Cl. ......... 358/1.18; 358/450; 358/1.2; 358/1.9; 358/1.15; 358/1.16

(58) Field of Classification Search ................. 358/1.15, 358/1.16, 1.9, 1.2, 1.13, 1.18, 450; 345/629
See application file for complete search history.

(56) References Cited

U.S. PATENT DOCUMENTS

| | | | |
|---|---|---|---|
| 5,991,516 A | 11/1999 | Desmond et al. | |
| 6,330,973 B1 | 12/2001 | Bridgelall et al. | |
| 6,672,212 B1 | 1/2004 | Ferlitsch | |
| 6,924,904 B2 * | 8/2005 | Stevens et al. | 358/1.18 |
| 2002/0030836 A1 | 3/2002 | Motoyama | |
| 2003/0095284 A1 | 5/2003 | Parry | |
| 2003/0227639 A1 | 12/2003 | Ferlitsch | |
| 2004/0190032 A1 | 9/2004 | Ferlitsch | |
| 2005/0068582 A1 | 3/2005 | Ferlitsch | |
| 2005/0179923 A1 | 8/2005 | Sojian et al. | |
| 2005/0190397 A1 | 9/2005 | Ferlitsch | |
| 2006/0023239 A1 | 2/2006 | Ferlitsch | |

FOREIGN PATENT DOCUMENTS

| | | |
|---|---|---|
| EP | 0478335 A2 | 1/1992 |
| JP | 2001312377 | 9/2001 |
| JP | 2006-263969 | 10/2006 |
| WO | WO 0188730 A1 | 11/2001 |
| WO | WO 02084928 A2 | 10/2002 |

OTHER PUBLICATIONS

Webpage publication: Information about Lexmark ImageQuick Card capabilities, available at www.lexmark.com, printed Feb. 12, 2007.

\* cited by examiner

*Primary Examiner* — Thomas Lett
(74) *Attorney, Agent, or Firm* — Kirton & McConkie; Michael F. Krieger; Adam D. Stevens

(57) ABSTRACT

An effective and efficient means for composition printing of multi-page image data is disclosed. Multiple image files may be received and read into memory to be processed and printed as a single job. Pages may be reordered and/or a subset of pages may be selected for printing by changing the link order between image file directories (IFDs) in the image headers before sending the image data to a printing device. Once processed to select and reorder pages for printing, the image data is streamed directly to the output, with each offset entry in the IFD being modified on-the-fly to correspond to its relocated position. When an image is skipped, the data associated with the image is not written out to the printing device. When the end of one file is reached, the next file is merged into the existing output stream relative to the end of the previous file.

19 Claims, 11 Drawing Sheets

DIRECT COMPOSITION PRINTING METHOD FOR RAPID STREAMING

BACKGROUND OF THE INVENTION

1. Field of the Invention

The present invention relates to direct (driverless) printing of multi-page image data, and more particularly to effective and efficient composition printing of multiple multi-page image data files as a single print job.

2. Background and Related Art

Some printers and printer controllers support the direct printing (without a print driver) of a limited number of image formats (e.g. TIFF, JPEG[2K], PNG, BMP, GIF, EXIF). However, such printers and printer controllers are limited in that they are unable to batch print multiple image files as a single print job (i.e., composition print).

One method of direct printing provides the user the ability to download (e.g., FTP) a device independent document/image file format (e.g., TIFF), which is native to the device, for printing. The document is then printed according to the device's default device settings. But this method is limited, in that: (1) It cannot do composition printing. Instead, each file is printed as a separate job with each job separately finished. (2) It requires longer processing times. By printing each image file as a separate job, the device incurs an inter-job delay between each image file. (3) It does not perform streaming conversion. If the page order in an image file is non-linear, then the entire image file may need to be read in to the device before processing can start. This results in a longer wait before a first page is output. (4) It provides no method for manipulating page order or selection of limited pages for printing. FIG. 1A is a depiction of this method.

In one improved method using a Direct Print API (DPAPI), when a TIFF file is selected for printing, the DPAPI parses each image file directory (IFD) entry and checks the file offsets to determine if the TIFF file is in streaming page order. If not, the DPAPI creates a new file and uses a relocation method which copies the contents of the non-streaming TIFF file to the new TIFF file in streaming page order.

While this is an improvement to the above, it is still limited in that: (1) It is not optimally efficient, since the TIFF data must be copied to another file, which results in slower input/output than memory access. Additionally, when the data is ready to print, the TIFF data must be read from the hard disk a second time. (2) It cannot do a composition print. Each file is printed as a separate job with each job separately finished. (3) It requires longer processing times. Besides the additional processing previously discussed, by printing each image file as a separate job, the device incurs an interjob delay between each image file. (4) It provides no method for manipulating page order or selection. FIG. 1B is a depiction of this method.

In another improved method, the page order and or selection of a TIFF file is supported by manipulating the next IFD link in each IFD entry. For example, if the user chooses reverse page order, the method would reverse each next IFD link, such that each IFD would now point to the previous IFD, instead of the subsequent IFD. In another example, a page selection can be implemented by changing certain IFD links to skip over IFDs for which printing is not desired (i.e., those pages of the TIFF file which are not part of the page selection to be printed). Further, the manipulations can be performed in memory.

But this method still has limitations, in that: (1) It cannot perform a composition print. Each file is printed as a separate job with each job separately finished. (2) It requires longer processing times. By printing each image file as a separate job, the device incurs an inter-job delay between each image file. (3) It does not perform streaming conversion. If the page order in an image file is non-linear, then the entire image file may need to be read into memory before processing can start. This will result in a longer time before first page out. FIG. 1C is a depiction of this method.

A further improved method uses efficient reordering of pages within a TIFF file. In this method, the IFD's next IFD offsets are re-linked in memory according to the selected/ordered page order. The TIFF data is then passed through a streaming relocator, to relocate the images in streaming page order, which is then passed directly to the printer.

While this method has benefits of performing all operations in memory, it still has limitations, in that: (1) It cannot do composition printing. Each file is printed as a separate job with each job separately finished. (2) It requires longer processing times. By printing each image file as a separate job, the device incurs an inter-job delay between each image file. FIG. 1D is a depiction of this method.

BRIEF SUMMARY OF THE INVENTION

Embodiments of the invention provide an effective and efficient means for composition printing of multi-page image data (e.g., TIFF), where: (1) Multiple image files are printed as a single file or job; (2) Pages may be reordered and/or a subset of pages may be selected for printing; and (3) The image data is fed to a printing device in streaming page order.

In embodiments of the invention, a user can submit multiple image-formatted files for composition printing (a batch print job where all the individual files are processed as a single job) to the printing device. Processing may occur after the image file is mapped into memory so that random access can be performed, eliminating file input/output. Pages may be reordered by changing the link order between image file directories (IFDs) prior to sending the image data to the output. Each image (page) has an associated image header, where a field in the image header points to the offset of the next image. Page order may be changed by changing the next IFD links to point to a different reordering of the images. A subset of pages may be selected for printing by changing the link order between the IFDs to skip the unprinted pages prior to sending the image data to the output. When a page is not printed, the associated IFD is dropped, in memory, from the link list of IFDs.

Once processed to select and reorder pages for printing, each file is streamed directly to the output, using a streaming data relocation method. Each offset entry in an IFD is modified on-the-fly to correspond to its relocated position. Additionally, when an image is skipped, the data associated with the image is not written out to the printing device. Once a file has been written out to the printing device, a check is performed to determine if it is the last file. If not, the next file is streamed in relative to the end of the previous file. Thus, an effective and efficient method may be provided for direct composition printing of multi-page image data.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1A:
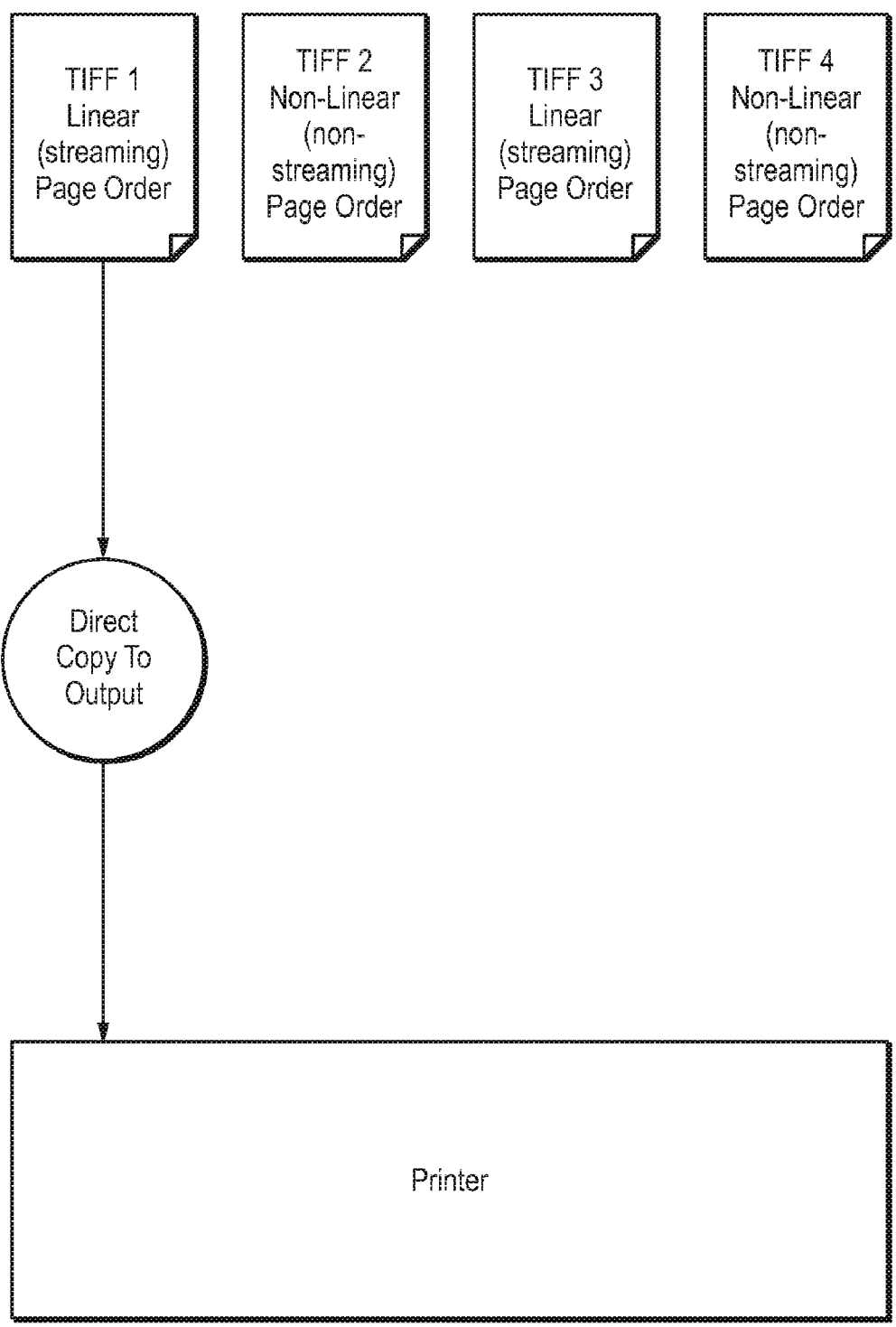
FIG. 1A shows an existing method for direct printing individual TIFF files without processing.
Figure 1B:
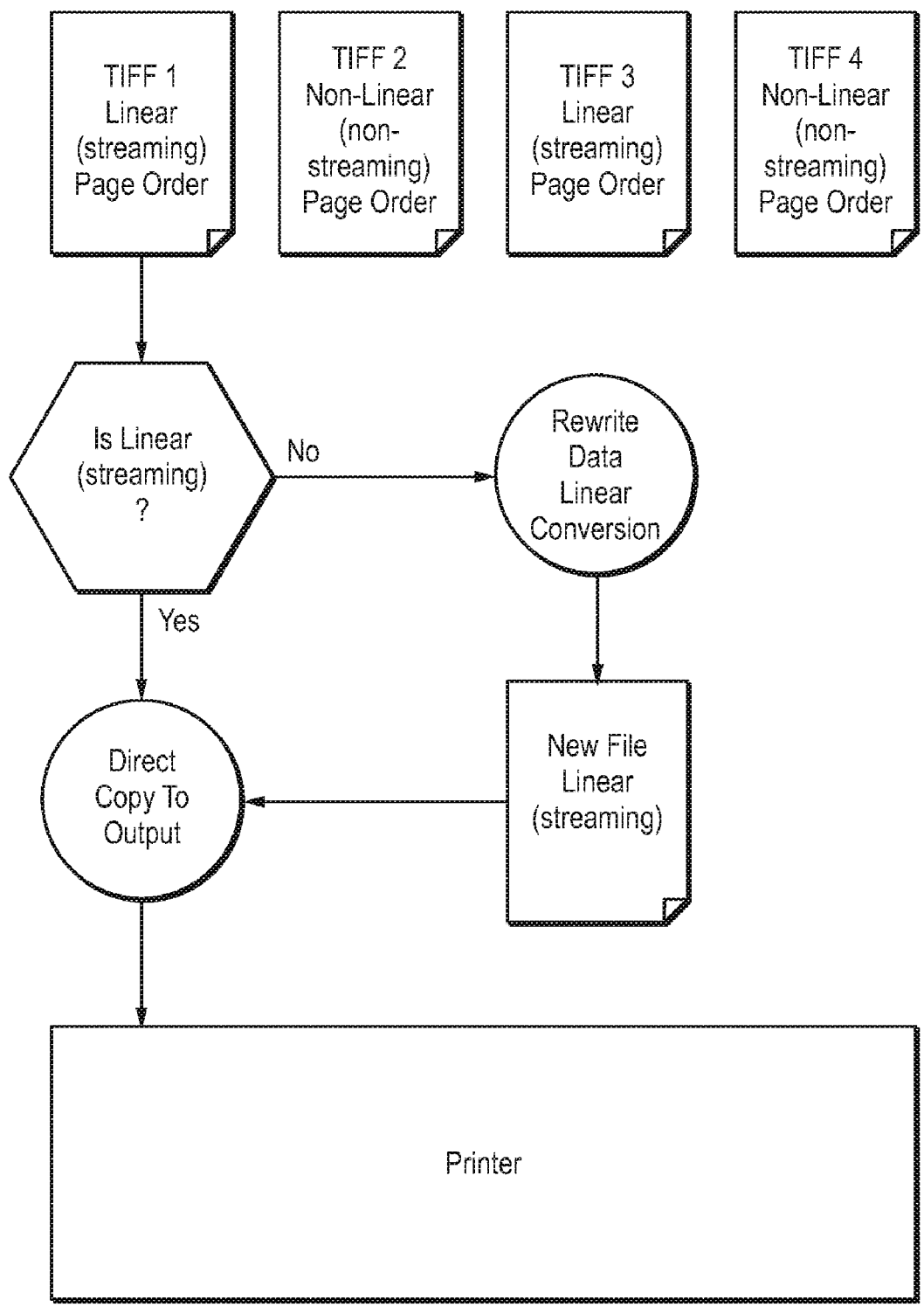
FIG. 1B shows an existing method for direct printing individual TIFF files with processing that rewrites non-linear TIFF files into a linear streaming format.
Figure 1C:
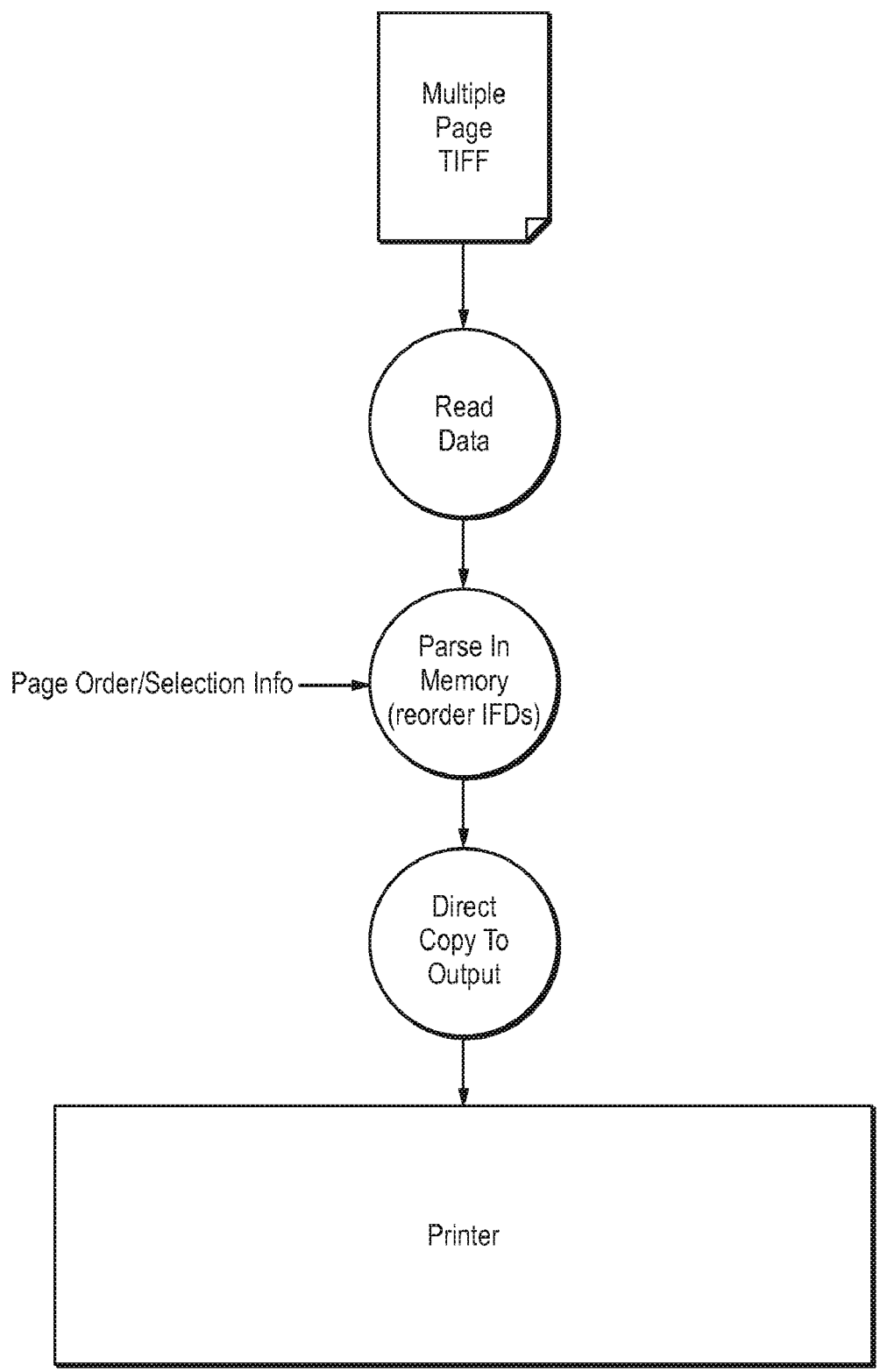
FIG. 1C shows an existing method for direct printing individual TIFF files including emulated page ordering.
Figure 1D:
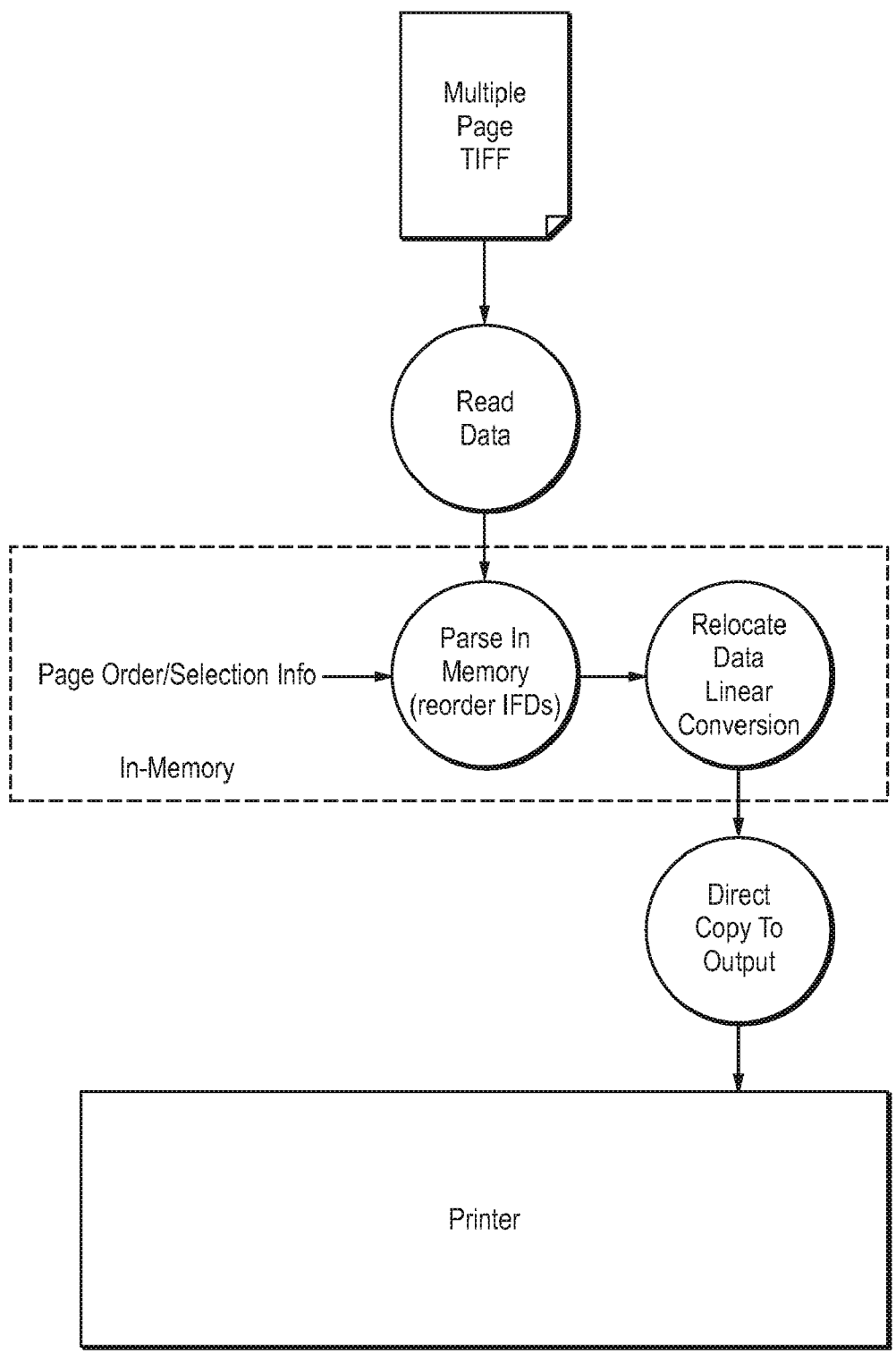
FIG. 1D shows an existing method for direct printing individual TIFF files including page selection and page relocation.

Referring now to the Figures, a description of the embodiments of the present invention will be given. It is expected that the present invention may take many other forms and shapes, hence the following disclosure is intended to be illustrative and not limiting, and the scope of the invention should be determined by reference to the appended claims.

Embodiments of this invention provide an effective and efficient means for composition printing of multi-page image data (e.g., TIFF), where: (1) Multiple image files are printed as a single file or job; (2) Pages may be reordered and/or a subset of pages may be selected for printing; and (3) The image data is fed to the printer in streaming page order.

An exemplary operating environment includes a printer that is capable of taking as input multi-page image data (e.g., TIFF). Additionally, the exemplary operating environment may include a direct image data submission utility, which may perform some post-processing of the image data and may further directly submit the post-processed image data to the printer.

In embodiments of the invention, a user can submit multiple image-formatted files (e.g., TIFF) for composition printing to the printer. Composition printing is defined as a batch print job where all the individual files are processed as a single job (for example, all files may be stapled as one job or otherwise be treated as a single job instead of each outputted file being finished separately).

Embodiments of the invention provide an effective and efficient means for composition printing. This may be provided by, first, eliminating file input/output as all processing occurs in memory. The image file is mapped into memory, so that random access can be performed. All subsequent operations may be performed in the memory version of the image-format files. Second, the pages may be reordered in memory by changing the link order between the image file directories (IFDs) prior to sending the image data to the output. Each image (page) has an associated image header, where a field in the image header points to the offset of the next image. Page order may be changed by changing the next IFD links, in memory, to point to a different reordering of the images.

Third, a subset of pages may be selected for printing by changing the link order between the IFDs to skip the unprinted pages prior to sending the image data to the output. When a page is not printed, the associated IFD is dropped, in memory, from the link list of IFDs. Fourth, once processed, each file is streamed (i.e., in linear page order) directly to the output, using a streaming data relocation method or stream relocator. The stream relocator uses random access of the image data in memory to rearrange the data in streaming order as it is written out to the printer. Each offset entry in an IFD is modified on-the-fly to correspond to its relocated position. Additionally, when an image is skipped, the data associated with the image is not written out to the printer.

Fifth, once a file has been written out to the printer, a check is performed to determine if the file is the last file. If not, the next file is merged into the existing output stream using a stream relocator. When there is another file, the output stream is not closed. Instead, the next file is streamed into the same output stream, but the relative offset is readjusted to the end of the previous stream. In other words, the next file is streamed in relative to the end of the previous file. Thus, an effective and efficient method may be provided for direct composition printing of multi-page image data.

Figure 2A:
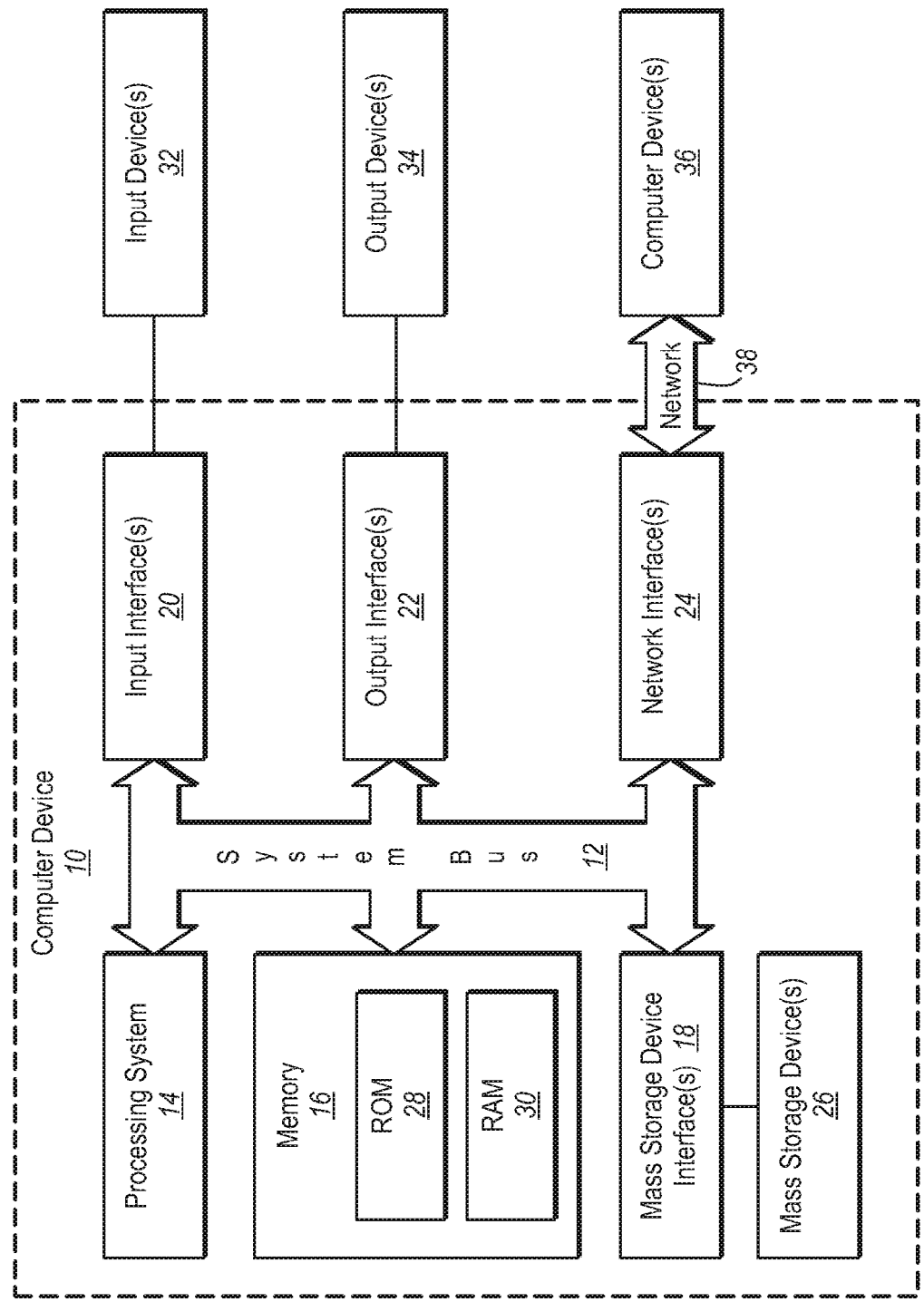
FIG. 2A illustrates a representative system that provides a suitable operating environment for use of the present invention.

Inasmuch as at least some embodiments of the present invention embrace utilization of a computer device, FIG. 2A and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), non-volatile random-access memory ("NVRAM"), read-only memory ("ROM"), programmable read-only memory ("PROM"), erasable programmable read-only memory ("EPROM"), electrically erasable programmable read-only memory ("EEPROM"), flash memory (e.g., a USB thumb-drive), compact disk read-only memory ("CD-ROM"), magnetic memory (e.g., a hard drive), or any other device or component that is capable of providing data or executable instructions that may be accessed by a processing system.

With reference to FIG. 2A, a representative system for implementing the invention includes computer device 10, which may be a general-purpose or special-purpose computer. For example, computer device 10 may be a personal computer, a notebook computer, a personal digital assistant ("PDA"), cellular camera phone, digital camera or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, a flash memory device, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives, flash memory devices, and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), IEEE 1394, IRDA, Bluetooth, Wi-Fi, or another interface.

One or more output interfaces 22 may be employed to connect one or more corresponding output devices 34 to system bus 12. Examples of output devices 34 include a monitor or display screen, a printer, a plotter, a multi-function device, or other output device. A particular output device 34 may be integrated with or peripheral to computer device 10. Examples of output interfaces 22 include a video adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces 24 include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2B:
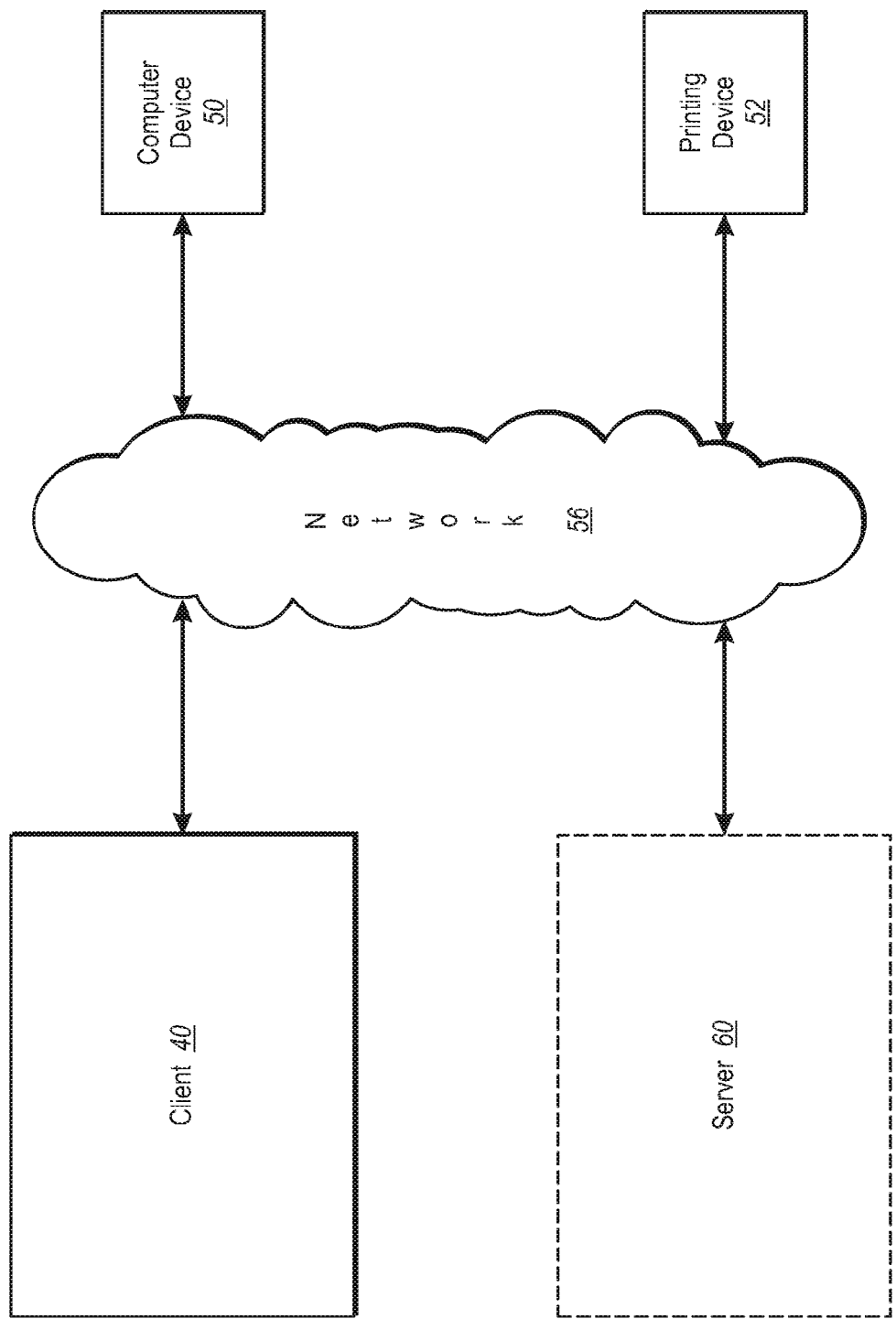
FIG. 2B illustrates a representative system configuration in association with embodiments of the present invention.

While those skilled in the art will appreciate that embodiments of the present invention may be practiced in a variety of different environments with many types of computer system configurations, FIG. 2B represents a representative networked system configuration that may be used in association with an embodiment of the present invention. While FIG. 2B illustrates an embodiment that includes a client 40, a computer device 50, a printing device 52, and optionally a print server 60 connected to a network, alternative embodiments include more than one client 40, a plurality of printing devices 52, no server 60, and/or more than one server 60 connected to a network 56. Other embodiments of the present invention include local, networked, or peer-peer printing environments where one or more computer devices 50 are locally connected to a one or more printing devices 52. Moreover, embodiments in accordance with the present invention also include wireless networked environments, or where the network 56 is a wide area network, such as the Internet. Further, printing device 52 may be a multi-function printer (MFP), a facsimile device, or any other type of printing device.

In some embodiments, all processing relating to providing direct composition printing of multi-page image data may be performed by applications on client 40 or by another computer device 50. In other embodiments, some or all processing relating to providing direct composition printing of multi-page image data may be performed by applications on server 60. Those skilled in the art will readily appreciate from the description below the many ways and system configurations in which the present invention may be practiced.

Thus, in accordance with the illustrated embodiment and other embodiments of the present invention, an effective and efficient system and method may be provided for direct composition printing of multi-page image data, as will be further explained below.

Figure 2C:
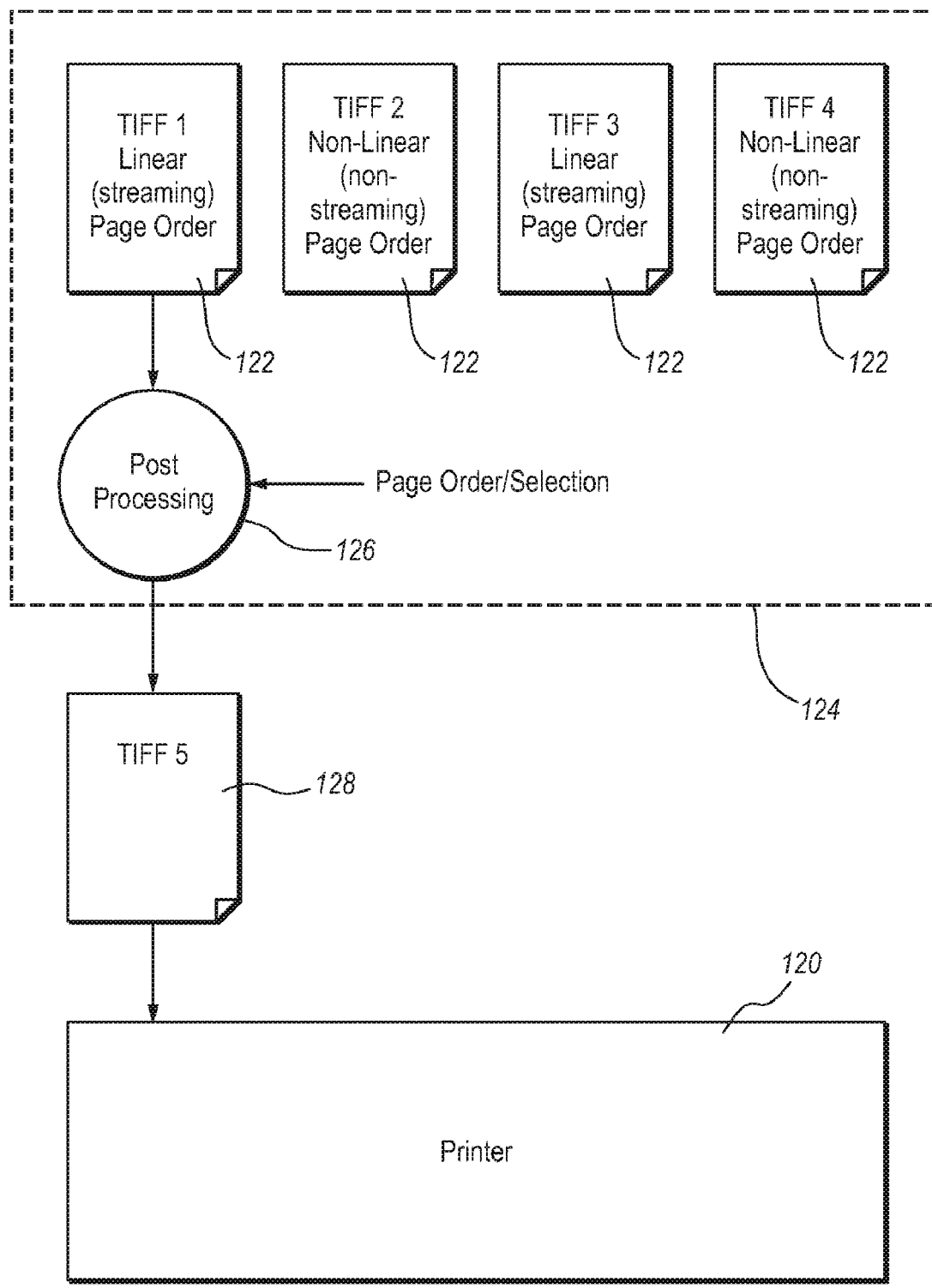
FIG. 2C shows an exemplary operating environment for practicing embodiments of the present invention.

FIG. 2C shows an exemplary operating environment that includes a stand-alone, network, locally or remotely connected printing device 120. Examples of printing devices 120 include printers, multi-functional peripheral devices (MFPs), facsimile devices, filing devices, format conversion devices, publishing devices, scanners, copiers, electronic whiteboards, audio/video devices, digital cameras, and X-ray, MRI, and CAT-scan devices. The printing device 120 may take multiple-page image data files 122 (e.g., TIFF or any other type of multi-page image data file capable of direct printing on printing device 120) (also referred to as "image files 122," "files 122," or "image data files 122") as input (e.g., print operation) or may produce multiple-page image data as output (e.g., conversion).

Figure 3A:
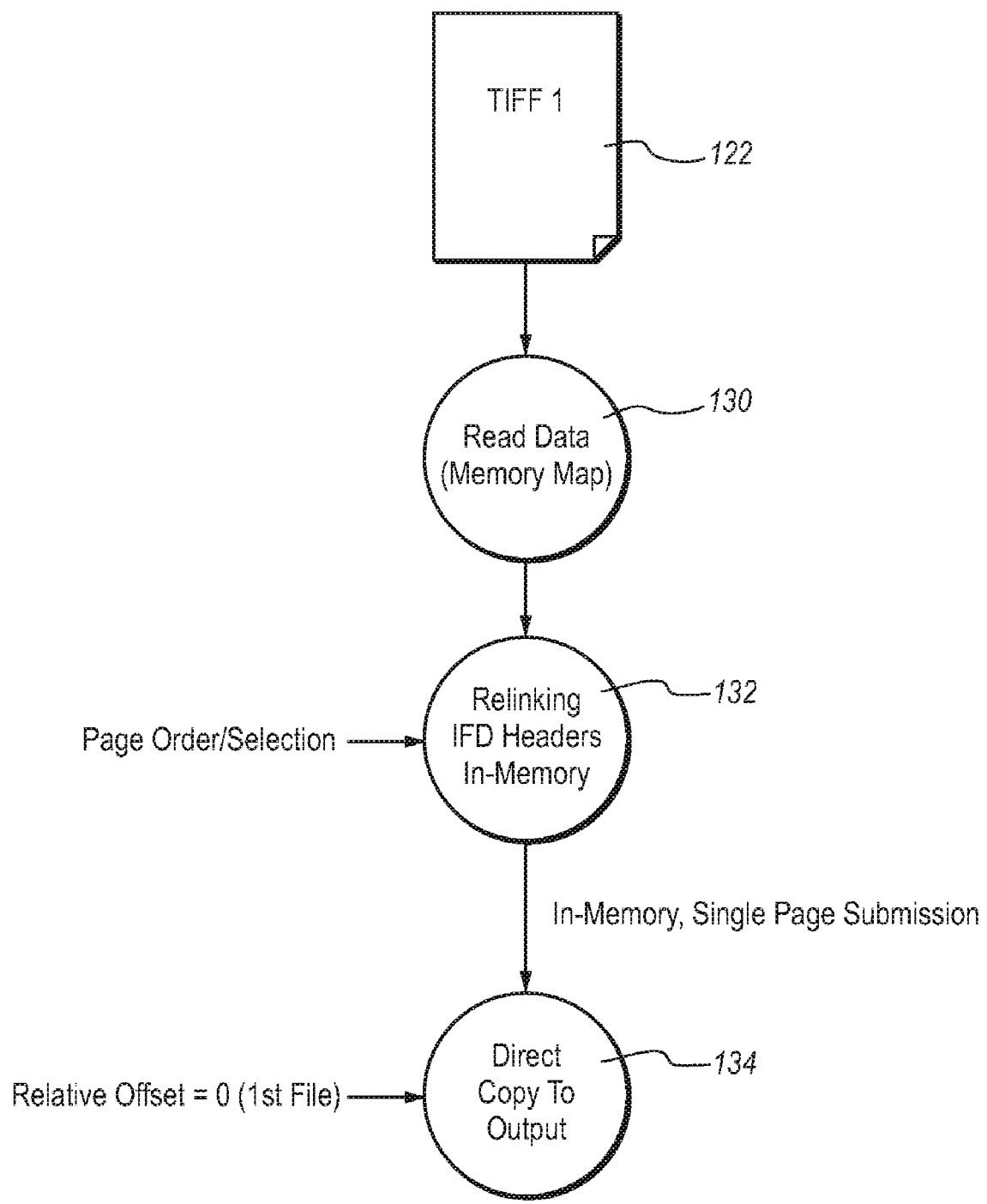
FIG. 3A shows processing that may occur on a first file for a composition print job.

The exemplary operating environment also includes a data source 124 for directly submitting the image data (i.e., w/o conversion to another format) to the printer. As discussed above, the data source 124 may be one or more client computing devices, or may also be any other data source 124 known in the art capable of interfacing with and transmitting image data to/from a printing device 120. In some embodiments, data source 124 may be a portable computer device or a computer device that is locally connected to the printing device 120 or connected to the printing device 120 by a network, wireless connection, or other remote connection. In some embodiments, the image data may be post-processed 126 on the client computing device or other data source 124 before it is submitted as a direct copy output 128 to the printer. In other embodiments, the client computing device may pass the image data to another computing device, such as server 60 illustrated in FIG. 2B, and the post-processing 126 may occur on the other computing device. The post-processing 126 may include some page ordering and page selection, as desired. FIG. 3A shows some post-processing 126 that may occur on a first file 122 for a composition print, while FIG. 3B shows some post-processing 126 that may occur on a second or later file 122 of a composition print job.

Figure 3B:
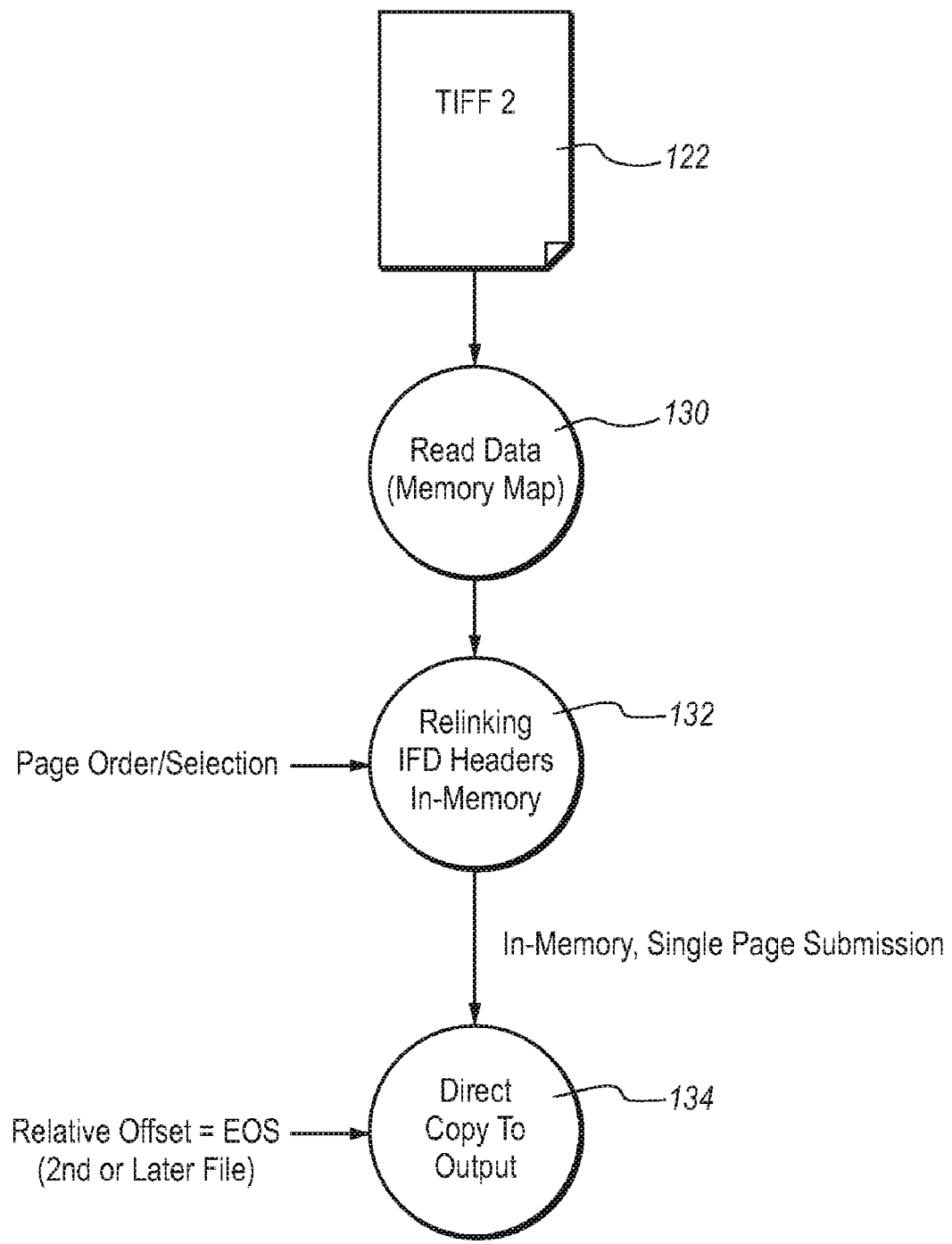
FIG. 3B shows processing that may occur on a second or later file of a composition print job.

For each image file 122 that is to be printed as a composition print, the image data is mapped into memory of the data source 124 at a step 130, as shown in FIGS. 3A and 3B, to allow in-memory random access. Additionally, the memory mapping is implemented to allow write access to the in-memory copy, but without writing out the changes (if any) to the more-permanent associated file 122 on the data source 124, such as a file 122 contained on a long-term storage/memory component of the data source 124. Any write changes to the in-memory copy of the file 122 are held in cache until processing/printing is complete and the file 122 in memory is closed. When the file 122 in memory is closed, the cache is purged instead of flushed (i.e., the file(s) 122 in memory are not written back to the long-term storage of data source 124). Each file 122 may be mapped into memory at the same time, in groups, or individually when being processed.

Once the image file(s) 122 is/are in memory, a user may specify either a reordering or a subset of pages to print, or both. If the pages are to be reordered, the order in which the image files 122 are processed may also be changed. For example, if a user specifies reverse order printing, the page order of individual files 122 may be changed to reflect reverse ordering, and the image files 122 may also be processed in reverse order of their submission. In the case of booklet page order, all the image files 122 may be mapped into memory, and the files 122 may be processed in parallel.

Once mapped into memory at step 130, the image file directory (IFD) headers of each file 122 will be parsed by following their next IFD links. Using this method, the location of each IFD header can be found without parsing the entire image data. Page selection and page reordering may then occur in-memory at step 132 by relinking the IFD headers.

Page selection may be implemented by maintaining a cardinal page number ordering of each IFD in sequential image order. For example, the first IFD in the first file 122 may be assigned page 1, the nth IFD in the first file 122 is assigned page N, the first IFD in the second file 122 may be assigned page N+1 (the next page number after the last IFD in the previous file 122), and the mth IFD in the second file 122 may be assigned page N+M, etc. Page selection may then be implemented by relinking the IFDs to skip over any of the pages that are not to be printed.

This relinking of the IFDs to skip pages may include one or more of the following processes. If the page not to be printed is the page associated with the first IFD in a file 122, then the first IFD offset in the file header is changed to the IFD that follows the first IFD. If the page not to be printed is the page associated with the last IFD in a file 122, the next IFD offset of the previous IFD is set to NULL, to indicate the previous IFD is associated with the last image in the file 122. If the page not to be printed is a page associated with neither the first or last IFD, then the next IFD offset of the previous IFD is set to the next IFD offset of the page to be dropped (i.e., the next IFD offset of the previous IFD is set to the IFD that follows the page to be dropped (not printed). The relinking process is repeated as needed until the IFDs are linked so as to skip over all pages that are not to be printed.

Once page selection, if any, has occurred, the pages may be reordered. One of skill in the art will recognize that page reordering may occur prior to page selection in some embodiments. One of skill in the art will also recognize that page reordering and page selection may be performed as simultaneous processes in other embodiments. Pages are reordered by changing the IFD links from the normal page order to the new page order. For example, for reverse order, the last IFD of the last file 122 would be reset as the first IFD. Each remaining IFD in the file 122 would be relinked in reverse order, so that the original first IFD would become the last IFD.

As another example, booklet reordering can be done in conjunction with N-up (particularly 2-up) printing by reordering the IFD links as follows for a single image file 122. The IFD for page 1 is followed by that for page N−1, then those for pages 2, N−2, 3, N−3, etc. For booklet reordering across multiple files, IFDs are linked across the files and the files are processed in parallel. For example, in the cardinal page numbering across two files 122 as discussed above, the IFD for page 1 is followed by the IFD for page M+N−1, then pages 2, M+N−2, 3, M+N−3, etc. One of skill in the art will readily appreciate that booklet printing can be extended to parallel processing of any number of image files 122.

Figure 4A:
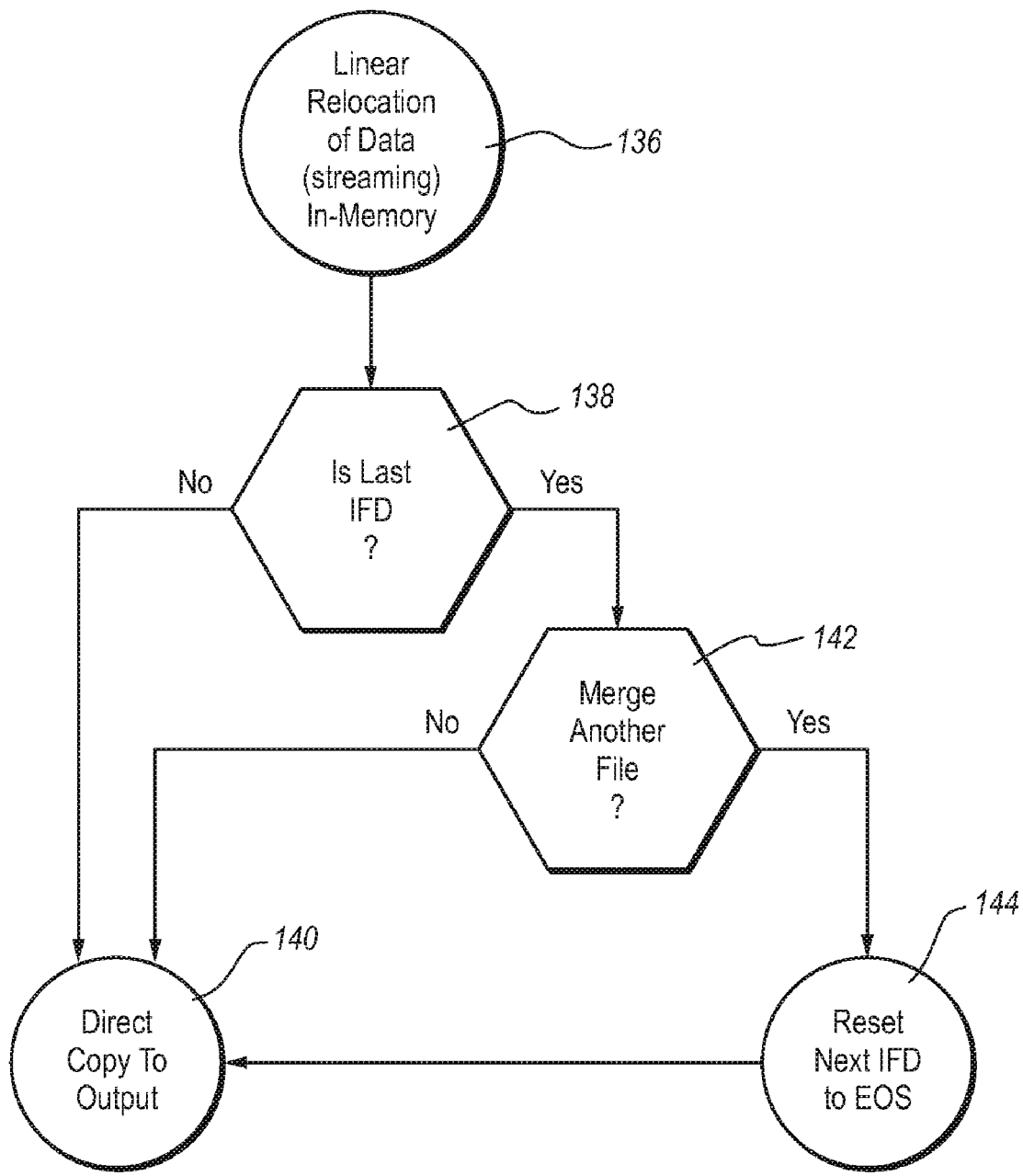
FIG. 4A shows processing that may occur on a file of a composition print job.

Once the pages have been selected and/or reordered (if any), each file 122 is streamed directly to the output at step 134, in the proper page order, as is described with reference to FIGS. 4A and 4B. After in-memory linear relocation of the data through page selection and page reordering has occurred at step 136 (and as described with reference to and depicted in FIGS. 3A and 3B), the first image file 122 to be output is streamed directly to the output, as follows. First, the first IFD offset in the TIFF header is set to the first byte after the header, if the first IFD offset is not already so set. Then, the TIFF header of the first file is copied directly to the output. The current end of stream (EOS), i.e., the number of bytes copied over to the output so far, is remembered as the current relative offset for the first IFD.

Then, each linked IFD in the in-memory copy of the file 122 is traversed, in the modified page order, and the IFD entries are modified as needed: all file offset entries are identified, and for each file offset entry, the location of the corresponding data, relative to the current EOS, is recalculated and the offset value is then replaced with the recalculated offset value. The updated IFDs are then copied directly to the output. For each offset (pointer) entry, if the data at the offset is/are offsets themselves, then these offsets are recalculated, relative to the current EOS, and the data is then written directly to the output. As each prior IFD and related data is copied directly to the output, the process proceeds to step 138, where it is determined if the current IFD is the last IFD. If not, the IFD and its related data are copied directly to the output at step 140 and the process repeats with the next IFD.

If it is determined at step 138 that an IFD is the last linked IFD in the modified file 122, then a check is performed to determine if there is another file 122 to be output at step 142. If there is not another file 122, then the IFD and related data are copied directly to the output, and the process terminates. If, however, the IFD is the last linked IFD in the modified file 122 and there remains another file 122 to be output, additional actions are taken at step 144. First, the current EOS is reset to the number of bytes written to the output after the last IFD/image data from the first file 122 is copied over. Second, the next IFD field of the last IFD is reset to the reset EOS value (i.e., will point to the first byte written after this image file 122).

Figure 4B:
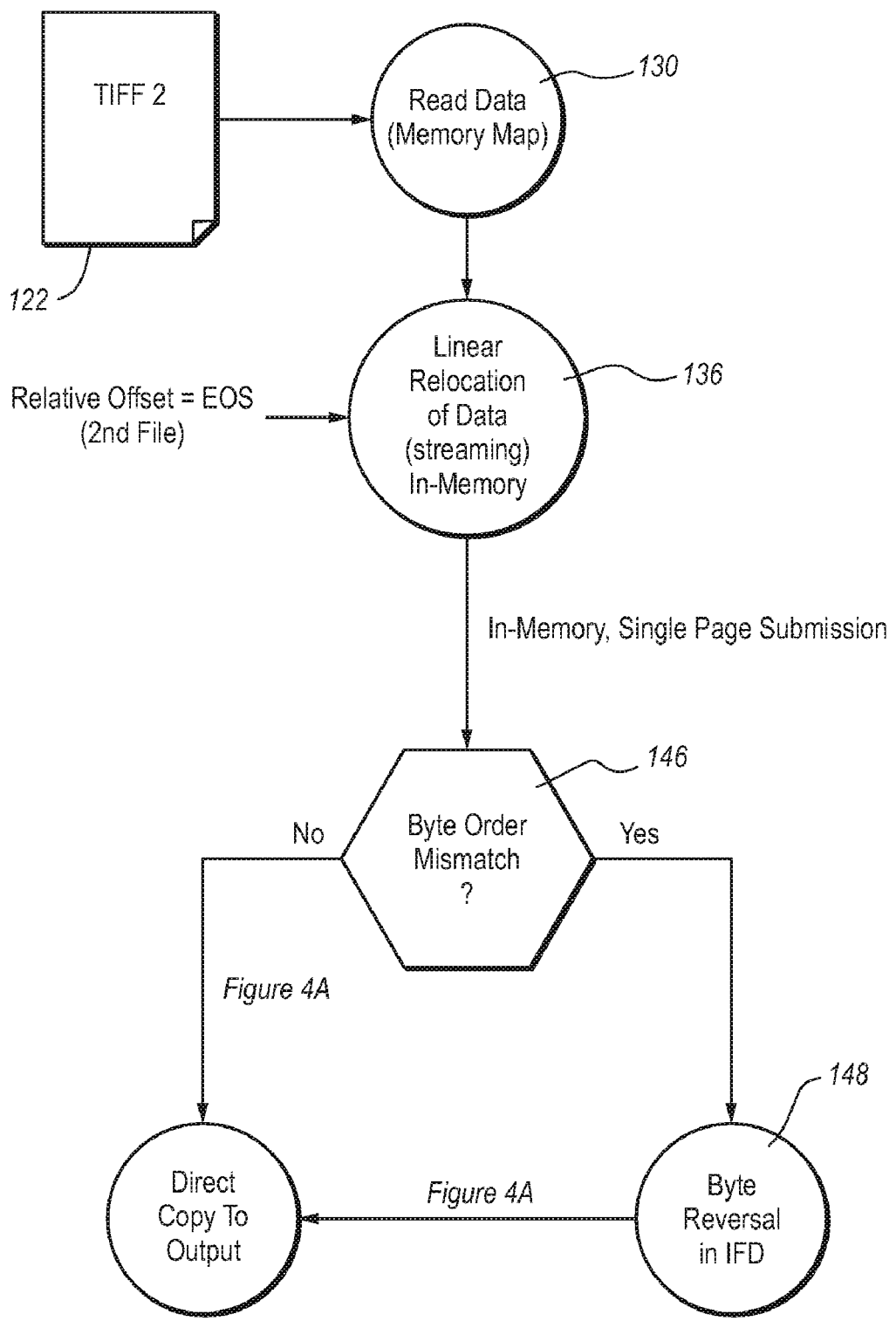
FIG. 4B shows additional processing that may occur on files of a composition print job.

Each subsequent image file 122 which is to be merged into the same output stream (i.e., composition print), is streamed directly to the output as described above with reference to FIG. 4A, with the following additional processing depicted in FIG. 4B: the TIFF header is checked for byte order at step 146, and the TIFF header is otherwise discarded (i.e., not copied over). The current end of stream (EOS), i.e., the number of bytes copied over to the output so far for the previous file(s) 122, is remember as the current relative offset for the first IFD in this image file. Each IFD in the file is traversed in current page order, and the same processes as previously described with reference to FIG. 4A are performed, with the following exception: if the byte order of this file is different from the first file, then the byte order is reversed at step 148 for each integer value in the IFD (e.g., count, data type, value) and values pointed to (offset) by the IFD entries.

Any time an IFD is the last IFD in a file 122, a check is performed to determine if there is another file 122. If there is another file 122, the same process as previously described is repeated with the next file 122. Thus, in accordance with the illustrated embodiments and other embodiments of the present invention, an effective and efficient system and method may be provided for direct composition printing of multi-page image data.

One of skill in the art will recognize that for booklet printing, the files 122 will be processed in parallel, rather than serially as has been described with reference to FIGS. 4A and 4B. This means that the IFDs and associated pages streamed to the output may alternate between files 122 as needed to obtain the booklet reordering previously described. In such cases, the IFD offset of a page in a file 122 may not refer to a next IFD within the file 122, but may instead refer to a next IFD within a different file 122.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method for composition printing of multiple multi-page image files comprising:
receiving a first multi-page image file and a second multi-page image file, wherein the first and second multi-page image files are to be printed as a single composition print job by a printing device;
mapping the first multi-page image file and the second multi-page image file into memory to permit random access to data in the first and second multi-page image files;
parsing image file directory (IFD) headers of the first and second multi-page image files by following next IFD links of the first and second multi-page image files to determine the location of each IFD header;
determining whether page reordering of at least one of the first and second multi-page image files is desired, and performing page reordering of the at least one of the first and second multi-page image files when page reordering is desired;
determining whether page selection to select only certain pages for printing of at least one of the first and second multi-page image files is desired, and performing page selection of the at least one of the first and second multi-page image files when page selection is desired; and
outputting the first multi-page image file and the second multi-page image file, as the single composition print job, to the printing device, the single composition print job being streamed to the printing device in a proper page order and absent any non-selected pages.

2. The method of claim 1 wherein the composition print job is streamed to the printing device without conversion into another format.

3. The method of claim 1 wherein the first and second multi-page image files comprise TIFF files.

4. The method of claim 1 wherein the first and second multi-page image files are not modified except as in-memory copies of the first and second multi-page image files that are discarded after the single composition print job is output to the printing device.

5. The method of claim 1 wherein determining whether page reordering of at least one of the first and second multi-page image files is desired, and performing page reordering of the at least one of the first and second multi-page image files when page reordering is desired comprises changing IFD links from an original page order to a new page order.

6. The method of claim 1 wherein the performing page reordering provides reverse page ordering by:
resetting an original last IFD of each of the first and second multi-page image files as a new first IFD of each of the first and second multi-page image files; and
relinking each of the remaining IFDs in each of the first and second multi-page image files in reverse order so that an original first IFD in each of the first and second multi-page image files becomes a new last IFD in each of the first and second multi-page image files.

7. The method of claim 1 wherein the determining whether page selection to select only certain pages for printing of at least one of the first and second multi-page image files is desired, and performing page selection of the at least one of the first and second multi-page image files when page selection is desired comprises relinking IFD links to skip over any pages not to be printed.

8. The method of claim 7 wherein the at least one of the first and second multi-page image files comprises a first IFD offset in a file header, a first IFD associated with a first page, a last IFD associated with a last page, an IFD associated with each page other than the first page and the last page, and an IFD offset associated with each page, and wherein the relinking IFD links to skip over pages not to be printed comprises a method selected from the group of:
changing the first IFD offset in the file header to the IFD that follows the first IFD when a page not to be printed is the first page;

changing the IFD offset of the IFD of a page immediately previous the last page to NULL when a page not to be printed is the last page; and changing the IFD offset of the IFD of a page immediately previous a page not to be printed to the IFD offset of the page not to be printed when the page not to be printed is neither the first page nor the last page.

9. The method of claim 1 wherein the outputting the first multi-page image file and the second multi-page image file, as the single composition print job, comprises:

outputting a header of the first multi-page image file;

traversing a plurality of linked image file directories (IFDs) of the first multi-page image file in the proper page order;

outputting the plurality of linked IFDs and data associated with each IFD from the first multi-page image file in the proper page order;

determining whether each of the plurality of linked IFDs of the first multi-page image file is a last IFD of the first multi-page image file;

discarding a header of the second multi-page image file when the last IFD of the first multi-page image file has been output;

traversing a plurality of linked IFDs of the second multi-page image file in the proper page order;

outputting the plurality of linked IFDs and data associated with each IFD from the second multi-page image file in the proper page order;

determining whether each of the plurality of linked IFDs of the second multi-page image file is a last IFD of the second multi-page image file; and checking whether there is another multi-page image file to be output as part of the single composition print job when the last IFD of the second multi-page image file is output.

10. A system for composition printing of multiple multi-page image files comprising:

a printing device;

a data source connected to the printing device; and a computer program product for receiving a plurality of multi-page image files from the data source, processing the plurality of multi-page image files into a single composition print job, and outputting the single composition print job, said computer program product comprising a computer-usable medium having computer-readable program code thereon, said computer-readable program code comprising:

computer program code means for receiving the plurality of multi-page image files to be printed as the single composition print job by the printing device;

computer program code means for mapping the plurality of multi-page image files into memory to permit random access to data in the plurality of multi-page image files;

computer program code means for parsing image file directory (IFD) headers of the first and multi-page image files by following next IFD links of the first and second multi-page image files to determine the location of each IFD header;

computer program code means for determining whether page selection to select only certain pages for printing of at least one of the plurality of multi-page image files is desired, and performing page selection of the at least one of the plurality of multi-page image files when page selection is desired;

computer program code means for determining whether page reordering of at least one of the plurality of multi-page image files is desired, and performing page reordering of the at least one of the plurality of multi-page image files when page reordering is desired; and computer program code means for outputting the plurality of multi-page image files, as the single composition print job, to the printing device, the single composition print job being streamed to the printing device in a proper page order and absent any non-selected pages.

11. The system of claim 10 wherein the data source is a computer device locally connected to the printing device.

12. The system of claim 10, further comprising a network connection connecting the data source and the printing device.

13. The system of claim 10 wherein the plurality of multi-page image files comprises TIFF files.

14. A system for composition printing of multiple multi-page image files comprising:

a printing device;

a data source connected to the printing device; and a computer program product for receiving a plurality of multi-page image files from the data source, processing the plurality of multi-page image files into a single composition print job, and outputting the single composition print job, said computer program product comprising a computer-usable medium having computer-readable program code thereon, said computer-readable program code comprising:

computer program code means for receiving the plurality of multi-page image files to be printed as the single composition print job by the printing device;

computer program code means for mapping the plurality of multi-page image files into memory to permit random access to data in the plurality of multi-page image files;

computer program code means for determining whether page selection to select only certain pages for printing of at least one of the plurality of multi-page image files is desired, performing page selection of the at least one of the plurality of multi-page image files when page selection is desired;

computer program code means for determining whether page reordering of at least one of the plurality of multi-page image files is desired. and performing page reordering of the at least one of the plurality of multi-page image files when page reordering is desired; and computer program code means for outputting the plurality of multi-page image files, as the single composition print job, to the printing device, the single composition print job being streamed to the printing device in a proper page order and absent any non-selected pages;

wherein the printing device is a device selected from the group of:
a printer;
a plotter;
a multi-functional peripheral device (MFP);
a filing device;
a format converter;
a facsimile device; and
a copier.

15. A system for composition printing of multiple multi-page image files comprising:

a printing device;

a data source connected to the printing device: and a computer program product for receiving a plurality of multi-page image files from the data source. processing the plurality of multi-page image files into a single composition print job, and outputting the single composition print job, said computer program product comprising a computer-usable medium having computer-readable program code thereon, said computer-readable program code comprising:

computer program code means for receiving the plurality multi-page image files to be printed as the single composition print job by the printing device;

computer program code means for mapping the plurality of multi-page image files into memory to permit random access to data in the plurality of multi-page image files;

computer program code means for determining whether page selection to select only certain pages for printing of at least one of the plurality of multi-page image files is desired, and performing page selection of the at least one of the plurality of multi-page image files when page selection is desired;

computer program code means for determining whether page reordering: of at least one of the plurality of multi-page image files is desired, and performing page reordering of the at least one of the plurality of multi-page image files when page reordering is desired; and computer program code means for outputting the plurality of multi-page image files, as the single composition print job, to the printing device, the single composition print job being streamed to the printing device in a proper page order and absent any non-selected pages;

wherein the computer program code means for performing page selection and the computer program code means for performing page reordering act on in-memory copies of the plurality of multi-page image files without generating and saving new multi-page image files and do not change original versions of the plurality of multi-page image files.

16. A method for composition printing of multiple multi-page image files comprising:

receiving a plurality of multi-page image files wherein the plurality of multi-page image files are to be printed as a single composition print job by a printing device;

mapping the plurality of multi-page image files into memory to permit random access to data in the plurality of multi-page image files;

parsing the image file directory (IFD) headers of the plurality of multi-page image files by following their next IFD links to determine the location of each IFD header determining whether page reordering of at least one of the plurality of multi-page image files is desired, and performing page reordering of the at least one of the plurality of multi-page image files when page reordering is desired by changing IFD links from an original page order to a new page order;

determining whether page selection to select only certain pages for printing of at least one of the plurality of multi-page image files is desired, and performing page selection of the at least one of the plurality of multi-page image files when page selection is desired by relinking IFD links to skip over any pages not to be printed; and outputting the plurality of multi-page image files, as the single composition print job, to the printing device, the single composition print job being streamed to the printing device in a proper page order and absent any non-selected pages.

17. The method of claim 16 wherein the plurality of multi-page image files comprises TIFF files.

18. The method of claim 16 wherein the outputting the plurality of multi-page image files, as the single composition print job, comprises:

outputting a header of a first multi-page image file;

traversing a plurality of linked image file directories (IFDs) of the first multi-page image file in the proper page order;

outputting the plurality of linked IFDs and data associated with each IFD from the first multi-page image file in the proper page order;

determining whether each of the plurality of linked IFDs of the first multi-page image file is a last IFD of the first multi-page image file;

discarding a header of a second multi-page image file when the last IFD of the first multi-page image file has been output;

traversing a plurality of linked IFDs of the second multi-page image file in the proper page order;

outputting the plurality of linked IFDs and data associated with each IFD from the second multi-page image file in the proper page order;

determining whether each of the plurality of linked IFDs of the second multi-page image file is a last IFD of the second multi-page image file; and checking whether there is another multi-page image file to be output as part of the single composition print job when the last IFD of the second multi-page image file is output.

19. The method of claim 16 wherein the plurality of multi-page image files are not modified except as in-memory copies of the plurality of multi-page image files that are discarded after the single composition print job is output to the printing device.

* * * * *